United States Patent [19]

Weigle

[11] 4,045,590

[45] Aug. 30, 1977

[54] MEAT ANALOG FROM AGGLOMERATED PROTEIN

[75] Inventor: Dwight Carl Weigle, Anderson Township, Hamilton County, Ohio

[73] Assignee: The Procter & Gamble Company, Cincinnati, Ohio

[21] Appl. No.: 729,522

[22] Filed: Oct. 4, 1976

[51] Int. Cl.$^2$ .......................... A23J 3/00; A23L 1/20
[52] U.S. Cl. ................................. 426/656; 426/802; 426/657
[58] Field of Search ............... 426/104, 574, 656, 802, 426/285, 657

[56] References Cited

U.S. PATENT DOCUMENTS

| 3,719,497 | 3/1973 | Galle et al. | 426/285 X |
| 3,719,498 | 3/1973 | Leidy et al. | 426/104 X |

*Primary Examiner*—Raymond N. Jones
*Assistant Examiner*—R. A. Yoncoskie

[57] ABSTRACT

A meat analog product resembling comminuted natural meat is made by a process of: (a) contacting with hot water and agitation a mixture comprising fat and two proteins having different temperatures of heat coagulation thereby heat coagulating one of the proteins to form agglomerates; and (b) heating the agglomerates to heat coagulate the other protein.

4 Claims, No Drawings

MEAT ANALOG FROM AGGLOMERATED PROTEIN

FIELD OF THE INVENTION

The present invention relates to a process for making simulated natural meat which has been comminuted such as hamburger. The products are made from alternate protein sources such as vegetable protein and egg albumen.

THE PRIOR ART

There are many prior art methods for making meat analog products. Some employ "spinning" techniques such as U.S. Pat. No. 2,682,466, June 29, 1954 to Boyer. Many techniques involve thermoplastic extrusion, for example, U.S. Pat. No. 3,488,770, Jan. 6, 1970, to Atkinson. Other methods of making simulated natural meat products from alternate protein sources include forming a "chewy protein gel" as in U.S. Pat. No. 2,830,902, Apr. 15, 1958 to Anson et al., non-turbulent stretching of proteinaceous dough as in U.S. Pat. No. 3,814,823, June 4, 1974 to Yang et al., and heating a creped proteinaceous dough sheet as in U.S. Pat. No. 3,840,679, Oct. 8, 1974 to Liepa et al.

Prior art processes relating to the formation of hamburger-like products include U.S. Pat. No. 3,102,031, August 27, 1963 to MacAllister, which relates to the formation of food granules to simulate the flavor, texture and appearance of chopped meat such as hamburger. The MacAllister patent teaches: forming a doughy mix of wheat gluten, soybean flour, meat flavor, and optionally, a minor portion of egg albumen and starch and then extruding, cutting, and drying the mix to form irregularly shaped, discrete granules. These granules can then be bound together to form patties by, for examle, egg albumen.

U.S. Pat. No. 3,197,310, July 27, 1965 to Kjelson teaches a process for preparing a simulated high-protein meat product prepared from gluten and defatted oilseed flours. In accordance with the Kjelson patent simulated meat products are prepared by blending a composition of wet gluten and defatted oilseed flour or meal until a fibrous body results whereupon the composition is set by oven heating. The compositions also preferably contain a heat coagulable protein such as egg albumen or dried egg whites.

U.S. Pat. No. 2,260,254, Oct. 21, 1941 to Kruse et al. teaches a method for producing a granular, dust-free, pleasant tasting, and highly nutritive food product from solvent extracted soybean oil meal. The process of the Kruse et al. patent involves subjecting wet soybean oil meal to heating or cooking at a temperature above the boiling point of water but not above about 300° F while keeping the meal in motion during the cooking as by stirring if the vessel is a stationary one or by tumbling if it is a rotating one such as a drum.

U.S. Pat. No. 3,047,392, July 31, 1962 to Rusoff et al. relates to the production of meat-like food products from vegetable and animal protein sources. In accordance with the Rusoff et al. patent a protein source is comminuted to form a homogenous mass which is used to form a paste or slurry by the addition of an aqueous liquid. This paste or slurry is then introduced into a reaction vessel, for example an autoclave, wherein the mass is agitated and heated in order to orient and coagulate the protein which is then cooled as rapidly as possible.

U.S. Pat. No. 3,108,873, Oct. 29, 1963 to Durst et al. is directed to a fabricated meat-like product which duplicates the general characteristics of such meat-base products as luncheon loaves and spreads. The Durst et al. process involves mixing a hydrophilic film-forming composition with a lipophilic fluid in the presence of water and beating the mixture until the lipophilic fluid is dispersed within the film-forming composition. The viscosity of the gel-like dispersion of Durst may be lowered by blending in additional quantities of water or increased by simply heating until the product becomes as viscous and bodied as desired. Suitable materials which may be selected for the film-forming composition are said to include soy protein, wheat protein, wheat germ, or egg albumen, or even hydrophilic colloids. The lipophilic fluid may be, for example, corn oil, cottonseed oil, or melted shortening.

It is apparent that there are many different ways to make meat-like products from vegetable and animal protein sources. However, many of the processes of the prior art involve complex process steps and equipment. It will be appreciated that a process for preparing meat analogs which utilizes straightforward process steps and simple equipment to make a product simulating the appearance, texture, taste, and cooking properties of natural meat would be advantageous. It would also be advantageous to be able to make a meat analog product from materials which are readily available. Furthermore, it is believed that it would be desirable to have a meat analog product which resembles comminuted meat, for example, hamburger, in texture and appearance.

Therefore, it is an object of the present invention to provide a process for making a meat analog which employs simple, straightforward, economical process steps. It is a further object of the present invention to provide a process which is capable of employing as starting ingredients readily available materials to make meat-like products. It is a further object of the present invention to provide a meat analog having the qualities of comminuted meat such as hamburger. These and other objects are achieved by the present invention as described in the following disclosure. Unless indicated otherwise, all percentages herein indicated are percent by weight.

SUMMARY OF THE INVENTION

It has been discovered that a simulated meat product resembling comminuted natural meat such as hamburger can be made by a process comprising the steps of:
A. contacting, under conditions of mild agitation and in the presence of fat, a mixture of a first heat-coagulable protein and a second heat-coagulable protein with water having a temperature at least equal to the temperature of coagulation of said first protein but less than the temperature of coagulation of said second protein, said agitation being sufficient to form agglomerates;
B. heating the agglomerates of step (A) to a temperature at least equal to the temperature of coagulation of said second protein thereby coagulating said second protein.

The product of the above process is then preferably mechanically broken into agglomerates of a desired size. The agglomerates can, of course, be additionally bound together in the form of patties or loaves to resemble, for example, hamburger or a meat loaf product. However, the agglomerates are particularly useful in dishes such as chili in which consumers are accustomed to the presence of natural meat products in particulate form.

DESCRIPTION OF THE INVENTION

It has been discovered that a meat analog product simulating comminuted, natural meat can bemade by a process comprising the steps of:

A. contacting, under conditions of mild agitation and in the presence of fat, a mixture of a first heat-coagulable protein and a second heat-coagulable protein with water having a temperature at least equal to the temperature of coagulation of said first protein but less than the temperature of coagulation of said second protein, said agitation being sufficient to form agglomerates;

B. heating the agglomerates of step (A) to a temperature at least equal to the temperature of coagulation of said second protein thereby coagulating said second protein.

The product of the present invention is particularly suitable for use in food products in which comminuted or particulate natural meat products have traditionally been employed. It is preferred to mechanically break the agglomerates resulting from step (B) into particles having the desired size. Suggested and preferred food dishes contemplated include chili, "sloppy joe"-type sandwiches, and so forth. Of course, it is also contemplated that the agglomerates of the present invention can be made into meat patties or meat loaf-type products by the addition of a binding agent. It is, of course, further contemplated that meat-like flavors will be added to the products of the present invention in order that the products may more accurately simulate natural meat products.

While there is considerable flexibility in selecting the exast proportions of the ingredients of present invention, it has been discovered that these proportions should be within the following ranges for best results. Thus, from about 5% to about 35% fat, from about 5% to about 20% of first heat-coagulable protein, from about 5% to about 20% of second heat-coagulable protein and from about 25% to about 70% of water is suitable to obtain meat-like products. Preferably, from about 15% to about 20% fat, from about 5% to about 15% of first heat-coagulable protein, from about 5% to about 15% of second heat-coagulable protein and from about 50% to about 60% water is employed in the process of the present invention.

The first step of the present invention involves contacting, under conditions of mild agitation and in the presence of fat, a mixture comprising a first heat-coagulable protein, and a second heat-coagulable protein with water. The first and second heat-coagulable proteins must be selected so as to have different temperature of heat coagulation. By temperature of coagulation is meant that temperature at which the protein material forms a gel or congealed substance. Further, each of the first and second heat-coagulable proteins should comprise from about 5% to about 20%, preferably from about 5% to about 15% of the mixture of step (A).

The property of proteins to "heat set" or gel upon the application of heat at a particular temperature or within a particular temperature range is well known to those skilled in the art. It is also well known that different proteins or proteins derived from different sources congeal or heat set at different temperatures. While it would be possible to select two different protein materials having coagulation temperature ranges which overlap, it is necessary in the process of the present invention to employ proteins having temperatures of coagulation which do not overlap, that is, it is necessary that the first heat-coagulable protein can be coagulated in accordance with the second step of the present process at a temperature which will not cause the second heat-coagulable protein to coagulate to a significant degree.

Examples of heat-coagulable proteins suitable for use as the first heat-coagulable protein in the process of the present invention include egg protein, or egg albumen, and 7S soy protein isolate as described in U.S. Pat. No. 3,953,611, Apr. 17, 1976 to Youngguist. Other heat-coagulable proteins, of course, may be suitable for use as the first heat-coagulable protein so long as they meet the requirements set forth in the above paragraph.

If either egg albumen or 7S soy protein isolate is selected as the first heat-coagulable protein, then there are a multitude of protein materials available and suitable as the second heat-coagulable protein. Of course, both the first and second protein must be edible. Suitable vegetable protein sources are soybeans, safflower seed, corn, peanuts, wheat, peas, sunflower seed, cottonseed, coconut, rapeseed, sesame seed, leaf proteins, single-cell proteins such as yeast and the like. Generally, of course, if the protein source is a vegetable protein, the protein prior to use is concentrated in some manner. Thus, for example, if the protein source is soybeans, the soybeans may be dehulled and solvent extracted to remove the oil therefrom. The resulting soybean meal may then be further processed by well-known means in order to precipitate or otherwise obtain a relatively concentrated protein material. Of course, the protein material must be treated in such a way as to retain its heat-coagulable properties. Thus, it is necessary to avoid processing which would denature the protein. The preferred source of protein for the second heat-coagulable protein is soybeans. It is also preferred that the protein be treated in a manner suitable to remove any off-flavors or odors which might otherwise negatively contribute to the final meat analog product. Means for accomplishing this are, of course, well known in the art.

Another ingredient required in step (A) of the present invention is fat, which should be present in an amount comprising from about 5% to about 35%, preferably from about 15% to about 20% of the mixture of step (A). The term "fat" is inclusive of oils and refers to glyceryl esters of fatty acids. Fats or oils suitable for use in the present invention must be edible and may be in solid or liquid form at the temperatures employed to heat-coagulate the first protein. Either a single fat or oil or mixtures of fats and/or oils may be employed. The fat may be added to the first and second proteins prior to or simultaneously with the addition of water. Suitable fats include soybean oil, cottonseed oil, coconut oil, rapeseed oil, peanut oil, olive oil, palm kernel oil, sunflower seed oil, rice bran oil, corn oil, sesame seed oil, safflower oil, wallflower oil, nasturtium seed oil, whale oil, sardine oil, herring oil, menhaden oil, pilchard oil, lard, tallow, and the like. Preferred fats are cottonseed oil, soybean oil, peanut oil, corn oil, lard, and tallow.

The fat or oil employed in this invention may, optionally, be employed in combination with a gelling agent such as ethyl cellulose in order to stabilize the fat or oil so that it does not leak or run out of the final product. Suitable stabilized fats or oils are disclosed in U.S. Pat. No. 3,935,319, Jan. 27, 1976 to Howard. It is believed that the fat component of the present invention serves to form a coating on the agglomerates during the agitation step thereby making them more meat-like and facilitating their separation into particulate comminuted meat-like material. Thus, it is required that fat be present in the mixture, although, of course, additional fat could be added to the final product. A particularly advantageous means of adding additional fat to the final product of the present invention is disclosed in U.S. Patent application Ser. No. 605,471, filed Aug. 18, 1975 for "Gelatinized Fat Particles" by William Lewis Baugher.

Step (A) of the present invention requires from about 25% to about 70% water. Preferably, from about 50% to about 60% water is employed. While the proteinaceous components of this invention may contain a minor amount of water, substantially all of the water of step (A) must be provided at the temperatures and in the manner set forth in step (A). Thus, with agitation, a mixture comprising first and second proteins may be contacted with a water/fat dispersion or a mixture of first and second proteins and fat may be contacted with water. The water must have a temperature which will offset heat coagulation of the first protein but not the second.

Of course, in addition to the above ingredients, the mixture of the present invention may contain various optional ingredients such as flavorings, coloring agents, nutritional additives, and so forth. Suitable flavors can be fat soluble or water soluble and can be added as a part of the fat component or the water component of the mixture. By selecting two proteins whose amino acid components are complimentary, additional nutrients will not be required to obtain highly nitritional qualities in the meat analog product.

The purpose of the first step of the present invention is to form agglomerates by contacting the two proteins of step (A) with water under conditions of mild agitation and in the presence of fat. The water must have a temperature sufficiently high to cause one of the two proteins, herein referred to as the "first protein", to heat-coagulate in order to form the desired agglomerates. Furthermore, the water must be a temperature which is insufficient to cause the other protein material, herein referred to as the "second protein", to heat-coagulate. By the addition of water at a temperature within this specific range, it has been discovered that agglomerates can be formed by agitating the mixture as by gently stirring it. The exact kind and degree of agitation required is that which effects the result of forming agglomerates. Suitable means by which agitation may be carried out includes mechanically stirring the mixture. Alternatively, the mixture may be tumbled as in a drum in order to form agglomerates. Of course, it is contemplated that those skilled in the art could agitate the mixture by other means to achieve the same result and such other means are included in the broad concept of the present invention. Should the agitation be excessively great, agglomerates will not be formed but, rather, a proteinaceous slurry will develop. Should the agitation be insufficient, the mixture will form no agglomerates at all and will remain substantially unchanged.

The final step of the present invention comprises heating the agglomerates of step (A) to a temperature at least equal to the temperature of coagulation of the second protein. The purpose of this heating is to heat-coagulate or heat set the second protein. Of course, the first protein has already been heat set during step (A). The temperature required to heat set the second protein depends upon the particular protein employed. If the preferred soy protein is used, temperatures within the range of from about 180° F to about 260° F are suitable to heat set the protein during step (B) of the present process.

While the products of the present invention can be used as made, it is contemplated that the products will be mechanically broken into smaller agglomerates for use as an extender for ground meat or for use in various food dishes such as chili, sloppy joes, casseroles and meat fillings. Also, the agglomerates can be combined with a binder material to form meat loaves or hamburger patties. Various eating qualities may be desired for various kinds of food dishes. The eating quality of the present products can be varied by, for example, varying the amount of water in the mixture of step (A). The less water, the tougher the eating quality; the more water, the more tender the eating quality. Also, by varying the ratios and/or the particular proteins employed in step (A), the eating quality is affected. Thus, the eating quality of the present product can be varied over a range to be appropriate to the particular food dish or to the consumers' preferences.

The following examples further illustrate the present invention.

EXAMPLE I

The following dry ingredients are mixed together in a 200 ml. glass beaker:

| | |
|---|---|
| Soy isolate ("Promine-F" available from Central Soya Company) | 10 grams |
| Egg white solids | 10 grams |
| Partially hydrogenated soybean oil (Crisco Oil available from The Procter & Gamble Company) | 16 grams |
| Dry artificial meat flavoring ingredients | 4 grams |

Sixty grams of water having a temperature of 200° F are added to the mixture which is gently stirred with a glass rod for about 10 seconds with the result that agglomerates are formed. The agglomerates are then placed in an autoclave having a temperature of 212° F for 4 minutes. This heating has the effect of heat setting the soy isolate, thus forming a product having a ground beef-like appearance.

EXAMPLE II

The product of Example I was allowed to cool to room temperature and was then broken by hand into small agglomerated particles having an apperarnace in size similar to that of commercially available ground beef. The particles do not stick together and are suitable for incorporation into food dishes employing particulate ground beef.

What is claimed is:

1. A process for making a simulated comminuted meat product comprising the steps of:
   A. contacting, under conditions of mild agitation and in the presence of from about 5% to about 35% fat, a mixture of from about 5% to about 20% of a first heat-coagulable protein and from about 5% to about 20% of a second heat-coagulable protein with from about 25% to about 70% water having a temperature at least equal to the temperature of coagulation of said first protein but less than the temperature of coagulation of said second protein, said agitation being sufficient to form agglomerates; and B. heating the agglomerates of step (A) to a temperature at least equal to the temperature of coagulation of said second protein thereby coagulating said second protein.

2. The process of claim 1 wherein said first heat-coagulable protein is selected from the group consisting of egg protein and 7S soy protein isolate.

3. The process of claim 2 wherein said second heat-coagulable protein is derived from soybeans.

4. The process of claim 3 wherein step (A) is carried out with from about 15% to about 20% fat, from about 5% to about 15% of said frist heat-coagulable protein, from about 5% to about 15% of said second heat-coagulable protein and from about 50% to about 60% water.

* * * * *